Patented Oct. 25, 1949

2,485,550

UNITED STATES PATENT OFFICE 2,485,550

QUATERNARY SALTS OF CARBAMIC ACID ESTERS OF TERTIARY-HYDROXYBENZYL-AMINES

John A. Aeschlimann, Montclair, N. J., and Arthur Stempel, Brooklyn, N. Y., assignors to Hoffmann-La Roche Inc., Nutley, N. J., a corporation of New Jersey No Drawing. Application June 25, 1946, Serial No. 679,265

4 Claims. (Cl. 260—294)

This invention relates to disubstituted carbamic esters of basic phenols containing a carbocyclic group joined to the phenolic benzene ring, the intermediates employed in the production of such compounds and to processes for their production. The compounds can be represented by the general formula:

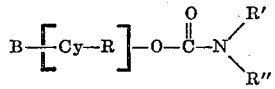

Cy stands for a carbocyclic group of the aromatic or alicyclic series fused to R, or joined directly or indirectly to R through linkages as, for example, O, S, CO, $(CR_1)_n$ where $R_1$ is H or methyl and n is a small integer line 1, 2 or 3; R represents a phenyl nucleus; B represents a basic group directly or indirectly attached to Cy or R, such as a dialkylamino, dialkylamino-alkyl or heterocyclic basic group, and R' and R'' stand for an alkyl, aryl or aralkyl group, or together with N form a heterocyclic nucleus as, for instance, of piperidine, morpholine, piperazine, tetrahydroisoquinoline, and the like. Other substituents in addition to those mentioned can be present in the compounds of the above formula, such as halogen atoms, alkoxy or alkyl radicals. The compounds may also be defined as disubstituted carbamic esters of poly-carbocyclic phenolic bases.

The disubstituted carbamic esters of the type described have highly useful properties as inhibitors of cholinesterase. Depending on the nature and position of the basic group, they are powerful cholinergic drugs with an anticurare action or compounds with curare-like action on voluntary muscle. Thus, those compounds having two substituents in the phenyl nucleus ortho to the carbamic ester group have a curare-like action.

The compounds are prepared in general by reacting phenols containing a carbocyclic group joined to the phenolic benzene ring and a basic group with disubstituted carbamyl chlorides. The proportion of the reagents employed may vary within wide limits depending on whether the free phenol, the metal phenolate, or an agent to bind the hydrogen chloride formed during the condensation is employed. Where the free phenol is employed it is preferred to employ one mol of the carbamyl chloride to two mols of the phenol containing both a basic group and a carbocyclic group. Where an acid-binding agent or the metal phenolate is employed, the ratio may be 1 mol of the carbamyl chloride to 1 mol of the phenol. However, the reagents may be employed in any other suitable reacting proportions.

The basic phenols employed as intermediates may be prepared according to one method by reacting the desired carbocyclic substituted phenol with formaldehyde and a secondary amine, a reaction sometimes referred to as the Mannich reaction. According to another method, the desired carbocyclic substituted phenol is coupled with phenyl diazonium chloride, reduced to form the carbocyclic-amino phenol and then alkylated to form the corresponding dialkylated-amino-carbocyclic substituted phenol. Phenols such as dialkyl-aminonaphthols, dialkylaminophenyl-phenols, for example, p-dimethylaminophenyl phenol, dialkylaminophenoxyphenols, and the like can be employed.

The disubstituted carbamic esters of phenols containing a carbocyclic group can be readily converted to the salt form, for example, the hydrochloride, methiodide, methobromine, p-tolusulfonate or methylsulfate by treatment with hydrogen chloride, methyl iodide, bromide or dimethylsulfate p-toluenesulfonate and like quaternizing agents. It is intended to include under the formula given above, not only the base, but also such salts.

The following examples will serve to illustrate the invention.

EXAMPLE 1

*Dimethyl carbamate of (2-hydroxy-5-phenylbenzyl)-trimethylammonium bromide*

To a solution of 50 grams of p-hydroxydiphenyl and 40 cc. of a 33% solution of dimethylamine in 300 cc. of 60% ethyl alcohol, there is added dropwise 25 cc. of a 35% formaldehyde solution. This is then heated on a steam bath for one hour, the oily layer that separated was dissolved in ether and extracted with dilute hydrochloric acid. On neutralization of the hydrochloric acid with sodium bicarbonate, an oil separated. The 3-dimethylamino-methyl-4-hydroxy diphenyl crystallized and could be recrystallized from ethanol. M. P. 88–90° C. This was then reacted in pyridine solution with dimethyl carbamyl chloride, there being obtained a viscous oil boiling at 186–190° C. at 1 mm. pressure. The compound obtained was the dimethyl carbamate of (2-hydroxy-5-phenylbenzyl)-dimethylamine. This was then quaternized with methyl bromide, to yield the dimethyl carbamate of (2-hydroxy-5-phenylbenzyl)-trimethylammonium bromide, M. P. 213–215° C. From the dimethylamine there was also obtained by treatment with hydrogen chloride, the dimethyl carbamate of (2-hydroxy-5-phenylbenzyl)-dimethylammonium chloride, M. P. 224–225° C.

Following the same procedure as above, there were also prepared the following compounds: phenylmethylcarbamate of (2-hydroxy-5-phenylbenzyl)-dimethylamine, phenylmethylcarbamate of (2-hydroxy-5-phenylbenzyl)-trimethylammonium bromide, M. P. 193–194.5°, (2-hydroxy-5-cyclohexylbenzyl)-dimethylamine, B. P. 129–135° at 0.5 mm. pressure, dimethyl carbamate of (2-hydroxy-5-cyclohexylbenzyl)-dimethylamine, M. P. 71–72°, dimethylcarbamate of (2-hydroxy-5-cyclohexylbenzyl)-trimethylammonium bromide, M. P. 203–204° C., N(2-hydroxy-5-phenylbenzyl)-1,2,3,4-tetrahydroisoquinoline, M. P. 85.5–86° C., dimethyl carbamate of N(2-hydroxy-5-phenylbenzyl)-1,2,3,4-tetrahydroisoquinoline, M. P. 122–123.5° C., dimethyl carbamate of N(2-hydroxy-5-phenylbenzyl) - N- methyl-1,2,3,4-tetrahydroisoquinolinium bromide, hemihydrate, M. P. 179–181°, monoethanolate, M. P. 156–158°; dimethyl carbamate of (2-hydroxy-5-phenylbenzyl)-diethylamine, B. P. 210° at 0.15 mm. pressure, dimethyl carbamate of (2-hydroxy-5-phenylbenzyl) diethylmethylammonium bromide, M. P. 168–170°. N(2 - hydroxy - 5 - phenylbenzyl) 2',6'-dimethylmorpholine hydrochloride, M. P. 247–250°, dimethylcarbamate of N(2-hydroxy-5-phenylbenzyl) 2',6'-dimethylmorpholine, B. P. 235° at 0.5 mm., dimethyl carbamate of N(2-hydroxy-5-phenylbenzyl) N-methyl (2',6'-dimethyl-morpholinium) bromide, M. P. 198–200° C., N(2-hydroxy-5-phenylbenzyl) pyrrolidine, M. P. 73.5–74.5°, dimethylcarbamate of N(2-hydroxy-5-phenylbenzyl)-pyrrolidine, M. P. 83–84°, dimethyl carbamate of N(2 - hydroxy - 5 - phenylbenzyl)-methylpyrrolidinium bromide, M. P. 157–159°.

The N(2 - hydroxy - 5-phenylbenzyl)-1,2,3,4-tetrahydroisoquinoline intermediate was obtained by reacting p-hydroxydiphenyl with formaldehyde and 1,2,3,4-tetrahydroisoquinoline. This intermediate was then esterified with dimethyl carbamyl chloride to form N(2-hydroxy-5-phenylbenzyl)-1,2,3,4 - tetrahydroisoquinoline, which could then be quaternized with methyl bromide.

The N(2 - hydroxy - 5-phenylbenzyl) - 2',6'-dimethylmorpholine hydrochloride was obtained by reacting p-hydroxydiphenyl, formaldehyde and 2,6-dimethylmorpholine and treating the resulting product with hydrogen chloride. In order to obtain the dimethyl carbamate of this phenol, it was reacted with dimethyl carbamyl chloride. The resulting compound could then be quaternized with methyl bromide.

N(2 - hydroxy - 5 - phenylbenzyl) - pyrrolidine was obtained by reacting p-hydroxydiphenyl with formaldehyde and pyrrolidine. The resulting intermediate could readily be formed into the carbamate ester and quaternized with a suitable quaternizing agent such as, for example, methyl bromide.

EXAMPLE 2

*Dimethyl carbamate of (2-hydroxy-1-naphthylmethyl)-trimethyl ammonium bromide*

To 15.4 grams of 1-dimethylaminomethyl-2-naphthol (obtained by reacting β-naphthol with formaldehyde and dimethylamine) in 50 cc. of dry pyridine, there was added 9 cc. of dimethyl carbamyl chloride. The resulting mixture was heated on a steam bath for 3 hours. After pouring onto ice water, made alkaline with 10% sodium hydroxide, extraction with ether, drying and distillation of the ether and pyridine in vacuo, a residue was obtained which was distilled and yielded the dimethyl carbamate of 1-dimethylaminomethyl-2-naphthol, B. P. 162–66° C. at 0.35 mm. This base was reacted with methyl bromide in acetone solution to give the dimethyl carbamate of (2-hydroxy-1-naphthylmethyl)-trimethylammonium bromide, M. P. 209–210° C. It could be recrystallized from a mixture of ethanol and ether. The base also gave, on treatment with hydrogen chloride, the corresponding hydrochloride, M. P. 202–203°.

EXAMPLE 3

*Dimethyl carbamate of (2-hydroxy-5-phenoxybenzyl)-trimethylammonium bromide*

In the same manner as described above, (2-hydroxy-5-phenoxybenzyl) dimethylamine was obtained by reacting 4-hydroxydiphenyl ether with formaldehyde and dimethylamine. This compound was isolated as an oil boiling at 148°–156° at 0.4 mm. On esterification with dimethyl carbamyl chloride in pyridine, the dimethyl carbamate was obtained as an oil, B. P. 169–172° at 0.3 mm. It was quaternized with methyl bromide in acetone to give the dimethyl carbamate of (2-hydroxy-5-phenoxybenzyl) - trimethylammonium bromide, M. P. 205–6° C.

Similarly, by starting with 4-hydroxydiphenyl thio ether, (2-hydroxy-5-phenylmercaptobenzyl)-dimethylamine was obtained on reaction with formaldehyde and dimethylamine. This intermediate was readily converted with dimethyl carbamyl chloride to form the diethyl carbamate of (2-hydroxy-5-phenylmercaptobenzyl) - dimethylamine, which when reacted with methyl bromide yielded the dimethyl carbamate of (2-hydroxy-5 - phenylmercaptobenzyl)-trimethylammonium bromide, M. P. 189–190° C.

EXAMPLE 4

*Dimethyl carbamate of (2-hydroxy-5-benzoylbenzyl)-trimethylammonium bromide*

Following the procedure similar to that outlined above, 4-hydroxy benzophenone when reacted with formaldehyde and dimethylamine yielded (2-hydroxy - 5 - benzoylbenzyl) - dimethylamine, this when reacted with dimethyl carbamyl chloride gave the dimethyl carbamate of (2-hydroxy-5-benzoylbenzyl)-dimethylamine. The amine when reacted with methyl bromide gave the corresponding trimethylammonium bromide, M. P. 193–195° C.

In a similar manner, the following were prepared: (2-hydroxy-5 - cumylbenzyl)-dimethylamine, M. P. 63–65° C., B. P. 170–176° C. at 4 mm.; dimethyl carbamate of (2-hydroxy-5-cumylbenzyl)-dimethylamine, B. P. 200° C., at 0.5 mm.; dimethyl carbamate of 2-hydroxy-5-cumylbenzyl trimethylammonium bromide, M. P. 197–199°.

EXAMPLE 5

*Dimethyl carbamate of (2-hydroxy-3-cyclohexylbenzyl)-methyl piperidinium bromide*

Five grams of 2-cyclohexyl-6-(N-piperidinomethyl)-phenol obtained by reacting o-cyclohexyl phenol, formaldehyde and piperidine were esterified in dry pyridine solution with a slight excess of dimethyl carbamyl chloride by warming for three hours in the steam bath. After pouring onto ice, the mixture was made alkaline with 10% sodium hydroxide and extracted with ether. After drying and removal of ether and pyridine, the residue was distilled at 180° C. and 0.7 mm. pressure. The distillate of the dimethyl carbamate of N-(2-hydroxy-3-cyclohexylbenzyl)- piperidine crystallized and could be recrystallized from aqueous ethanol as the hemiethanolate, M. P. 65–66° C. On standing in an acetone solution of methyl bromide, the crystalline dimethyl carbamate of (2-hydroxy-3-cyclohexyl benzyl)-methyl piperidinium bromide separated. It could be recrystallized from acetone as the hemihydrate, M. P. 197–199° C.

In a similar manner, by substituting morpholine for piperidine, the dimethyl carbamate of N-(2 - hydroxy - 3 - cyclohexylbenzyl)-morpholine, B. P. 210° at 0.35 mm. and the corresponding methyl morpholinium bromide, M. P. of the hemihydrate 185–187° C., were obtained. When dimethylamine was employed as the base instead of piperidine, the dimethyl carbamate of (2-hydroxy - 3 - cyclohexylbenzyl)-trimethylammonium bromide was obtained, M. P. hemihydrate 204.5–206° C.

EXAMPLE 6

*Dimethyl carbamate of (2-hydroxy-5-phenylbenzyl)-methyl morpholinium bromide*

To a solution of 50 grams of p-hydroxydiphenyl and 26 grams of morpholine in 200 cc. of 50% ethanol, there is added dropwise 25 cc. of a 35% formaldehyde solution. The mixture was then heated for one hour on a steam bath. An oily layer separated. After cooling, this layer was taken up in ether and extracted with dilute hydrochloric acid. On neutralization of the acid layer with sodium bicarbonate, an oil again separated, which was extracted with ether. After drying and removal of the ether by distillation, a crystalline residue was obtained which after recrystallization from ethanol yielded N-(2-hydroxy-5-phenylbenzyl)-morpholine melting at 83–84° C. To 15 grams of this material dissolved in 50 cc. of dry pyridine, 6 cc. of dimethyl carbamyl chloride were added and the mixture heated for three hours on the steam bath. It was then poured onto ice, made alkaline with 10.7 grams of sodium hydroxide, and extracted with ether. After drying and removal of the ether and the pyridine by distillation in vacuo, the dimethyl carbamyl ester of N-(2-hydroxy-5-phenylbenzyl)-morpholine boiling at 194–206° C. at 0.35 mm. pressure was obtained. On standing in an acetone solution of methyl bromide, the dimethyl carbamate of N-(2-hydroxy-5-phenylbenzyl)-N-methyl morpholinium bromide was formed. It was recrystallized from a mixture of ethanol and ethyl ether, M. P. 185–185.5°. In a similar manner, substituting piperidine for morpholine, there was obtained the dimethyl carbamate of (2-hydroxy-5-phenylbenzyl)-methyl piperidinium bromide, M. P. 180–181° C.

EXAMPLE 7

*Dimethyl carbamate of N-(2-hydroxy-5-phenylbenzyl) N - methyl - 1,2,3,4 - tetrahydroisoquinolinium bromide*

To 50 grams of p-hydroxydiphenyl and 39 grams of 1,2,3,4,-tetrahydroisoquinoline in 200 cc. of 50% ethanol there was added dropwise 25 cc. of a 35% formaldehyde solution. After heating for one hour on the steam bath, the oily layer that separated was dissolved in ether. On addition of dilute hydrochloric acid to the ether layer, a solid hydrochloride precipitated. After neutralization and recrystallization from ethanol, there was obtained N-(2-hydroxy-5-phenylbenzyl) - 1,2,3,4, - tetrahydroisoquinoline, M. P. 85.5–86° C. To a solution of 15 grams of this compound in 50 cc. of dry pyridine, 5 cc. of dimethyl carbamyl chloride were added and the mixture heated for 3 hours on the steam bath. On cooling, the hydrochloride of the ester crystallized and could be recrystallized from water. On neutralization with sodium hydroxide, the dimethyl carbamate of N-(2-hydroxy-5-phenylbenzyl) - 1,2,3,4 - tetrahydro - isoquinoline was liberated. It was recrystallized from ethanol and melted at 122–123.5° C. On standing in an acetone solution of methyl bromide, the dimethyl carbamate of N-(2-hydroxy-5-phenylbenzyl) - N - methyl - 1,2,3,4 - tetrahydroisoquinoline bromide crystallized. It could be recrystallized as the monoalcoholate from ethanol, melting at 156–158° C., or as the hemihydrate from water, melting at 179–181° C.

While the invention has been specifically illustrated in terms of the dimethyl carbamic acid esters, it should be understood that carbamic acid esters substituted by other alkyl radicals such as ethyl, propyl, and butyl and by aryl radicals of the benzene series, as, for example, phenyl, or substituted by aralkyl radicals as benzyl may be prepared in a similar manner by selection of the desired substituted carbamyl chloride for employment in the reaction.

While the method for preparing the esters has been illustrated in terms of reacting phenols containing a carbocyclic group joined to the phenolic benzene ring and a basic group with disubstituted carbamyl chlorides, the esters can also be prepared by other methods such as are described in U. S. Patent No. 1,905,990. For instance, the phenol can be converted to its carbonic ester or to its chlorocarbonate and either of these reacted with the appropriate amine, for example, dimethylamine in the case of preparing the dimethyl carbamic esters.

We claim:

1. A compound of the group consisting of dimethylcarbamate of (2-hydroxy-3-cyclohexylbenzyl)-methyl-piperidinium bromide, dimethylcarbamate of (2-hydroxy-3-cyclohexylbenzyl) trimethyl-ammonium bromide, phenylmethylcarbamate of (2-hydroxy-5-phenylbenzyl) trimethyl - ammonium bromide, and dimethyl - carbamate of (2 - hydroxy - 5 - phenylbenzyl) - methyl-morpholinium bromide.

2. Dimethylcarbamate of (2-hydroxy-3-cyclohexylbenzyl)-methyl-piperidinium bromide.

3. Dimethylcarbamate of (2-hydroxy-3-cyclohexylbenzyl) trimethyl-ammonium bromide.

4. Phenylmethylcarbamate of (2-hydroxy-5-phenylbenzyl) trimethyl-ammonium bromide.

JOHN A. AESCHLIMANN.
ARTHUR STEMPEL.

REFERENCES CITED

The following references are of record in the file of this patent:

UNITED STATES PATENTS

| Number | Name | Date |
|---|---|---|
| 1,905,990 | Aeschlimann I | Apr. 25, 1933 |
| 2,208,485 | Aeschlimann II | July 16, 1940 |
| 2,265,141 | Bruson I | Dec. 9, 1941 |
| 2,306,932 | Bruson II | Dec. 29, 1942 |

OTHER REFERENCES

Stevens et al., "Journ. Am. Chem. Soc." vol. 63 (1941), pp. 308–311.